United States Patent [19]

Monforte

[11] Patent Number: 4,781,519

[45] Date of Patent: Nov. 1, 1988

[54] END EFFECTOR TOOLS

[75] Inventor: Mathew L. Monforte, Hamilton, N.J.

[73] Assignee: Monfort Robotics, Inc., West Trenton, N.J.

[21] Appl. No.: 61,813

[22] Filed: Jun. 4, 1987

Related U.S. Application Data

[63] Continuation of Ser. No. 830,677, Feb. 19, 1986, abandoned, which is a continuation of Ser. No. 591,265, Mar. 19, 1984, abandoned.

[51] Int. Cl.$^4$ ............................................. B25J 15/04
[52] U.S. Cl. ................................. 414/730; 294/119.1; 294/902; 901/39; 901/41
[58] Field of Search ............... 414/735, 739, 740, 741, 414/744 A, 753, 751, 729; 901/30, 39, 41; 294/93, 119.1, 902

[56] References Cited

U.S. PATENT DOCUMENTS

| | | | |
|---|---|---|---|
| 1,314,044 | 8/1919 | Buker | 81/177 G |
| 1,804,843 | 5/1931 | Santiago | 294/93 X |
| 3,251,623 | 5/1966 | Fredholm | 294/93 X |
| 4,165,116 | 8/1979 | Baudoin et al. | 901/39 X |
| 4,512,709 | 4/1985 | Hennekes | 901/41 X |
| 4,518,187 | 5/1985 | Blatt et al. | 294/119.1 X |
| 4,591,198 | 5/1986 | Monforte . | |
| 4,627,785 | 12/1986 | Monforte . | |
| 4,638,231 | 1/1987 | Monforte . | |

OTHER PUBLICATIONS

"3-D Guidance System with Proximity Sensors", ASA Tech. Briefs, Summer 1980, NASA, vol. 5, No. 2, pp. 221, 414/5.

IBM Technical Disclosure Bulletin, Removable Robotic Devices, Cummins et al., vol. 24, #7A, Dec. 1981, 901/30.

Primary Examiner—Robert J. Spar
Assistant Examiner—Donald W. Underwood
Attorney, Agent, or Firm—Sachs & Sachs

[57] ABSTRACT

An exchangeable end effector tool includes, in combination; an engaging machanism, accessible to the extending fingers of a cooperating end effector disposed on the distal end of a robotic arm. The tool includes an indexing structure for mating and cooperating with the indexing device provided on the distal end of the end effector extending fingers and structure for cooperating with the mating locking device provided in the distal end of the end effector extending fingers which retains or releases the tool upon the end effector extending fingers responsive to a computer command signal coupled to the end effector locking device. The tool has the engaging mechanism affixed thereon, and includes a device for performing a prescribed function.

17 Claims, 4 Drawing Sheets

END EFFECTOR TOOLS

This application is a continuation of application Ser. No. 830,677, filed Feb. 19, 1986, now abandoned, which is a continuation of application Ser. No. 591,265, filed Mar. 19, 1984, now abandoned.

BACKGROUND OF THE INVENTION

1. Field of the Invention

The present invention relates to end effector tools, and more particularly, relates to an exchangeable end effector tool suitable for use on the distal end of a robotic end effector.

2. Discussion of the Relevant Art

Automated production lines in use today incorporate automatic machinery and automatic control arms to perform numerous functions, such as, inserting components, drilling holes, inserting screws, inserting washers, etc. However, generally these machines all perform a singular function and where multiple functions are performed they utilize a rotary head (carousel) whereby a drilling machine drills a plurality of holes of different sizes by rotation of the carousel or turret. In some of the later designs these automatic assembly machines (robots) perform more than one function and utilize an intemediary or slave robot, which moves to a storage bin, selects a tool and then moves to insert the tool in the automatic machine that performs the selected function. Applicant is not aware of any automatic machine that is capable of changing its own tool and performing more than one function.

Automatic production lines utilizing the concept of a robot having an arm capable of changing tools affixed to the distal end of a robotic arm, generally referred to as an end effector, is disclosed in U.S. patent application No. 577,570, filed on Feb. 6, 1984 by Mathew L. Monforte.

An end effector affixed on the robotic arm used in the automatic production line is described in detail in U.S. Pat. No. 4,591,198, filed on Feb. 16, 1984 by Mathew L. Monforte.

The automatic production line utilizing robots disclosed in these two patents overcome the shortcomings generally known to the state of the art and an exchangeable end effector tool utilized on a robotic end effector disposed on the distal end of the robotic arm is disclosed in detail herein.

Therefore, it is an object of the present invention to provide an exchangeable end effector tool that is adapted to be received on the extending fingers of an end effector.

It is another object of the present invention to provide an end effector tool which may be readily captured and released by an end effector disposed on the distal end of a robotic arm.

It is yet another object of the present invention to provide an end effector tool which when captured by an end effector maintains the dimensional and/or mechanical integrity of the system.

It is still yet another object of the present invention to provide an end effector tool that may readily be modified to perform alternative functions.

It is still yet another object of the present invention to provide an endeffector tool that may be captured by a robotic end effector when the end effector is moving in an outwardly direction.

It is yet another object of the present invention to provide an exchangeable end effector tool that may be captured by a robotic end effector when the fingers thereof are moving in an inwardly direction.

It is yet another object of the present invention to provide an end effector tool that is capable of utilizing the features of a sensing device incorporated in the fingers of the end effector.

It is still yet another object of the present invention to provide an exchangeable end effector tool capable of providing automatic sensing to indicate when the tool comes into contact with an object.

It is a further object of the present invention to provide an end effector tool that can be captured or released from the fingers of an end effector responsive to a computer command signal.

SUMMARY OF THE INVENTION

An exchangeable end effector tool, according to the principles of the present invention, comprises, in combination, an engaging device accessible to the extending fingers of a cooperating end effector disposed on the distal end of a robotic arm which includes, a tool indexing mechanism for mating and cooperating with the indexing mechanism provided on the end effector extending fingers, a means for cooperating with the mating locking device provided on the end effector extending fingers to retain the tool upon the extending fingers, the end effector locking device being responsive to a computer command signal and a tool device having the engaging device affixed thereon, the tool device being capable of performing a prescribed function.

The foregoing and other objects and advantages will appear from the description to follow. In the description reference is made to the accompanying drawing which forms a part hereof, and in which is shown by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

The subject matter which I regard as my invention is particularly pointed out and distinctly claimed in the concluding portion of this specification. The invention, however, both to organization and method of operation, together with further objects and advantages thereof may best be understood by reference to the following description taken in connection with the accompanying drawing, wherein like reference characters refer to like elements and in which:

DESCRIPTION OF THE PREFERRED EMBODIMENTS

Figure 1:
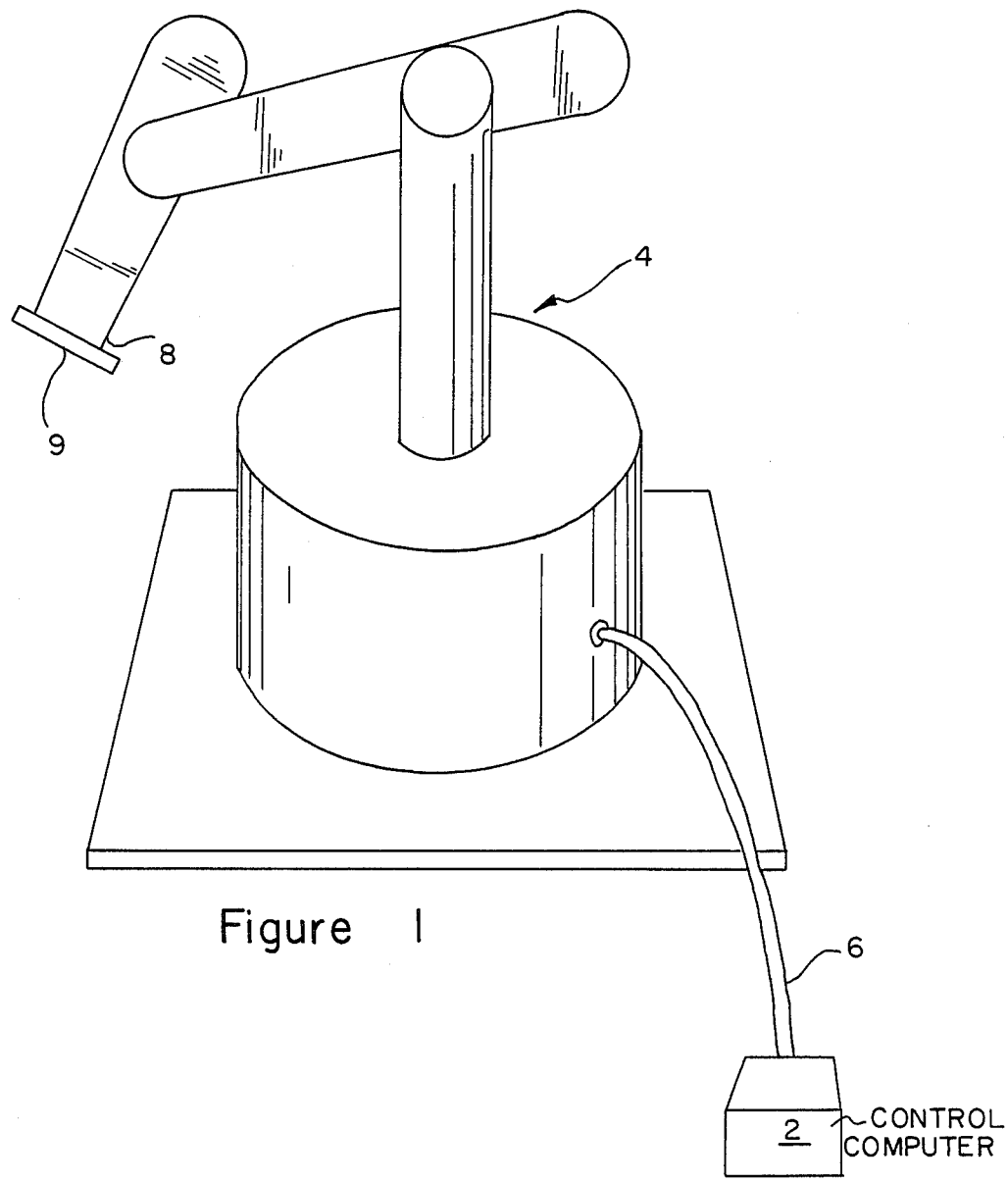
FIG. 1 is a pictorial representation of a computer controlled robotic arm with an end effector disposed on the distal end thereof, according to the principles of the instant invention.

Referring now to the figures, and in particular to FIG. 1, there is shown a computer 2, which may be of the type known as a PUMA Model #560, manufactured by Unimation, Inc. (a division of Westinghouse Co.) of Shelton Rock Lane, Danbury, Conn. which is coupled to a robotic arm 4, via a control cable 6. The distal end 8 of the robotic arm 4 is provided with a mounting plate 9 adapted to have an end effector 10 affixed thereon.

Figure 3:
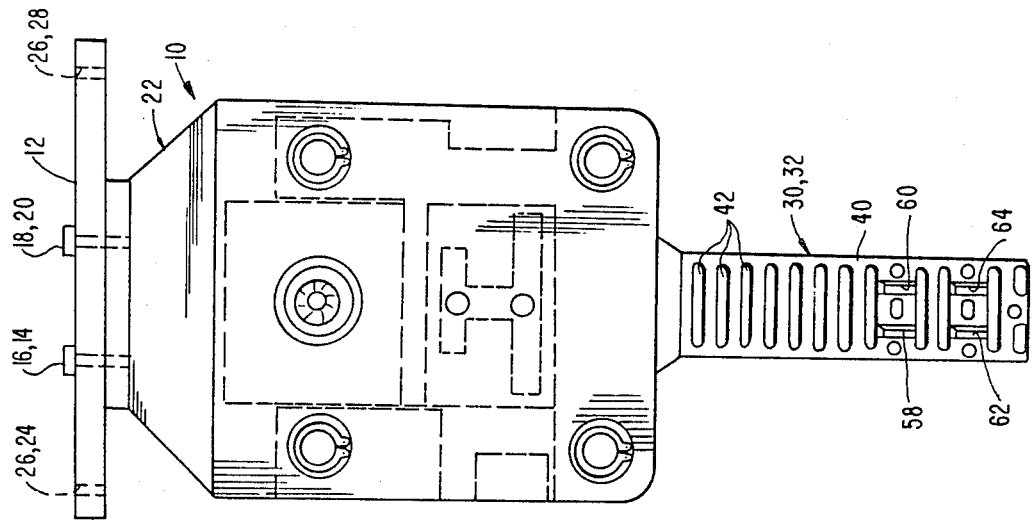
FIG. 3 is a side view in elevation of the end effector shown in FIG. 1.
Figure 2:
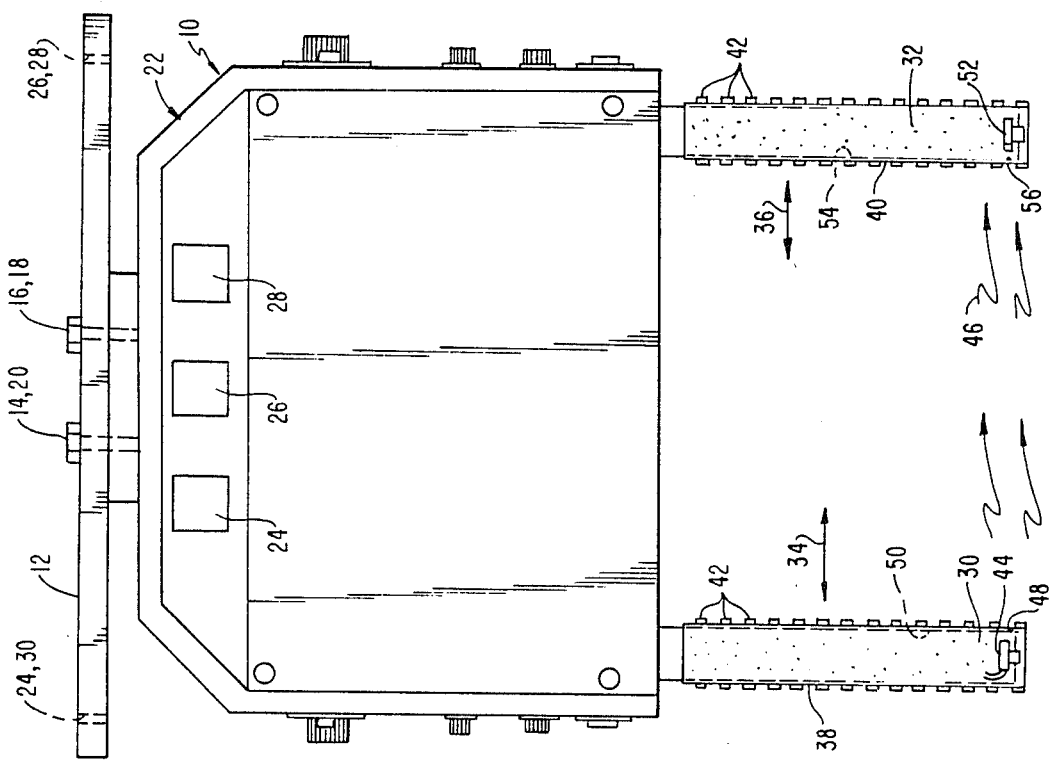
FIG. 2 is a side view, in elevation, of an end effector device suitable for using the instant exchangeable end effector tools.

Referring now to FIGS. 2 and 3, there is shown an end effector 10 which may be affixed on the distal end 8 of the computer controlled robotic arm 4 by means of an adaptor plate 12 and associated screws 14, 16, 18 and 20 which fasten the adaptor plate 12 to the housing 22 of the end effector 10. A plurality of screws or bolts, not shown, inserted in apertures 24, 26, 28 and 30 are utilized to affix the end effector 12 to the distal end 8 of the robotic are 4. The internal operating mechanisms of the end effector 10, and the functioning of the indicator lights 24, 26 and 28 are more clearly described in U.S. patent application Ser. No. 580,715, filed Feb. 16, 1984 by Mathew L. Monforte, which is included herein by reference in its entirety. The extending finger portions 30 and 32 of the end effector 12 are caused to move inwardly and outwardly in the direction of arrows 34 and 36 because of the unique mechanism provided in the end effector housing 12. The fingers 30 and 32 operate in opposing linear directions so that both fingers move in a linear inwardly direction or a linearly outward direction. Preferably, the fingers 30 and 32 are provided with a resilient boot or covering 38 and 40 having a plurality of protrusions 42 thereon to increase the frictional resistance of the fingers to enhance their ability to grasp objects.

Disposed in the distal end of finger portion 30 is an infrared light source 44 which when illuminated permits infrared light beams 46 to emanate, via an aperture 48, provided in the inwardly extending wall 50 of finger portion 30. An infrared light sensor or detector 52 is affixed proximate the distal end of finger portion 32 which has its inner wall 54 provided with an aperture 56 disposed in direct line with aperture 48 so that the light beams 46 may readily impinge upon the light detector 52. The function of the light beam and its application to an exchangeable end effector tool will be explained hereinafter.

The finger portions 30 and 32 are provided with a plurality of rectangular apertures 58, 60, 62 and 64 proximate the distal ends of the finger portions 30 and 32. These apertures preferably are rectangularly-shaped and extend through both of the extending finger portions 30 and 32. The shape and location of these apertures are selected to be of a preferred configuraton to provide an indexing means, thus allowing for mating with cooperating protruding portions provided on an exchangeable tool, as will be explained hereinafter, and will provide for engagement either in a closing or expanding mode of operation. Although a rectangular configuration utilizing four apertures is disclosed herein other configurations can work equally as well as shown in alternative embodiments described in conjunction with FIGS. 9A and 10A.

It is clearly to be understood that those knowledgeable in the art may utilize many other types of configurations to provide an indexing means so that the tool can be acquired by the fingers of the end effector in only one position. Other configurations can be equally suitable as long as the mechanical integrity (dimensional tolerances) are maintained so that the accuracy of the robotic arm remains within acceptable limits.

Figure 4:
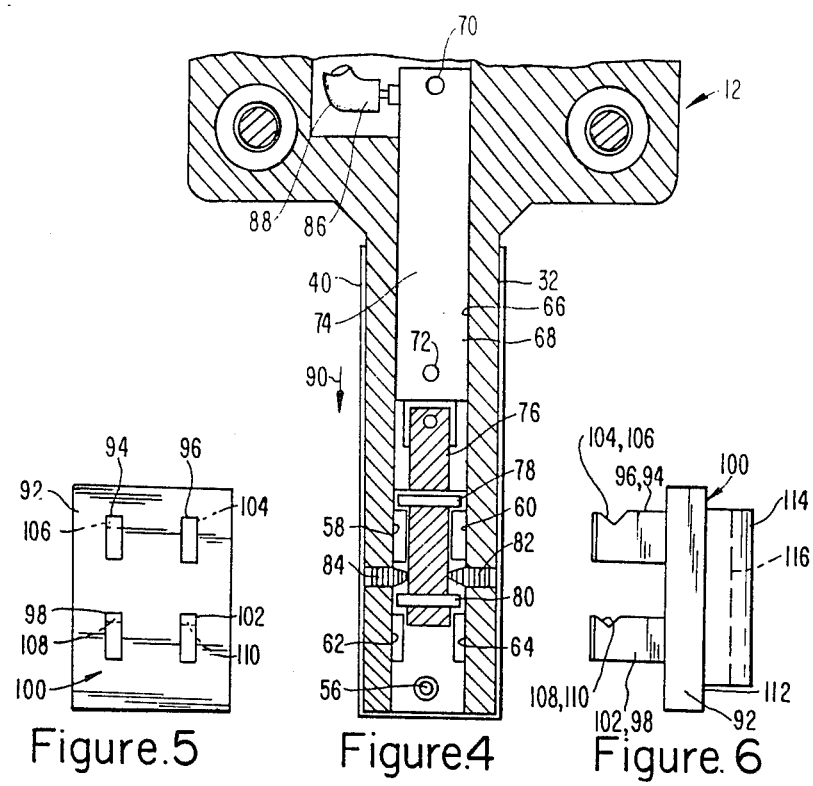
FIG. 4 is an enlarged partial end view of the end effector shown in FIGS. 1 and 2 with the finger portion cut away.

Referring now to FIG. 4, which is an enlarged partial view of a finger portion 32 of the end effector 12. Although one finger portion will be described herein, it is to be clearly understood that the cooperating finger portion 30 is also fabricated in a similar manner. The finger portion 32 is constructed to provide a hollow opening or channel 66 which is adapted to receive a miniature rectangularly-shaped piston mechanism 68 which functions as a tool locking device and is affixed in the channel 66 by means of two screws, not shown, in the mounting hole 70 and 72 provided in the body or housing 74 of the piston mechanism 68. A rectangularly-shaped rod 76 extends outwardly from the housing 74 and has embedded therein a pair of roll pins 78 and 80 disposed transverse of the rod axis and displaced from each other. The rod 76 is biased by a spring, not shown, to remain within the housing 74. When placed within the channel 66, it is manually extended and held in position with the use of guide stop screws 82 and 84 which insures both the correct alignment for piston rod 76 and places the roll pin slightly away from the apertures 58, 60, 62 and 64 so that they may be able to receive protruding members provided on the exchangeable tool 100.

The housing 74 of piston mechanism 68 is provided with an input port 86 which is connected by means of a flexible hose 88 to a source of compressed air, not shown. The application of compressed air to input port 86 drives piston rod 76 in the direction of arrow 90 thereby causing roll pins 78 and 80 to engage, capture and cooperate with the extending protrusion inserted within apertures 58, 60, 62 and 64 at the time it is supplied with the compressed air. The compressed air, causing the activation of piston mechanism 68, is controlled by a command signal provided by the computer 2 (FIG. 1).

Figure 5:
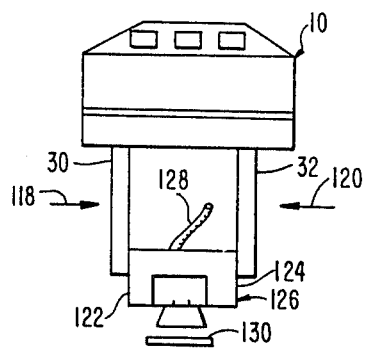
FIG. 5 is a front view in elevation of an exchangeable end effector tool, according to the principles of the present invention.
Figure 6:
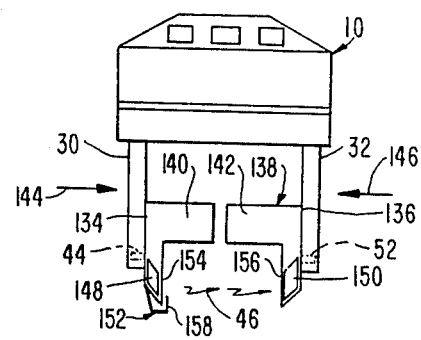
FIG. 6 is a side view in elevation of the exchangeable end effector tool shown in FIG. 4.

Referring now to FIGS. 5 and 6, which discloses a front and side view of an end effector tool 100 suitable for operation with extending finger portions 30 and 32 provided proximate the distal end of end effector 10. The engaging means of tool 100 and end effector 12 includes a plurality of outwardly extending protrusions 94, 96, 98 and 102, which function as tool indexing means, are preferably provided with V-shaped grooves 104, 106, 108 and 110, (locking means) respectively, which are adapted to receive and cooperate with roll pins 78 and 80 of the end effector locking device (piston 68) when extended into apertures 58, 60, 62 and 64, thereby maintaining the tool 100 in a fixed position insuring the mechanical integrity and dimensional accuracy of the robotic arm. The rear surface 112 is preferably provided with a resilient member 114 having a curved portion 116 suitable for receiving and retaining a curved component, not shown, sandwiched between the finger portions 30 and 32 when caused to move in an inwardly direction, or curved in the opposite direction when it is desired to have finger portions 30 and 32 move in an outwardly direction to engage the inner circumferential surface of a hollow curved member.

Figures 7, 8:
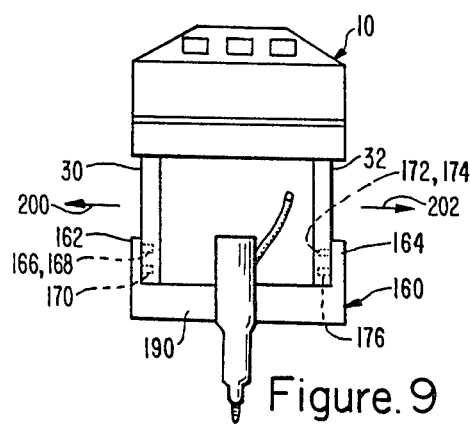
FIGS. 7, 8, 9 and 10 are reduced pictorial representations of alternative embodiments of exchangeable end effector tools.
Figure 7A:
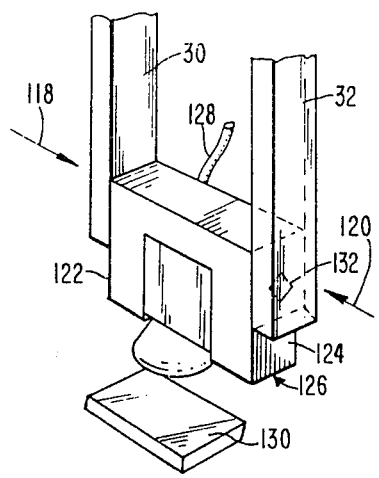
FIGS. 7A, 8A, 9A, and 10A are enlarged pictorial representations, in perspective, of the exchangeable end effector tool shown in FIGS. 7, 8, 9 and 10, respectively.

Referring now to FIGS. 7 and 7A, wherein FIG. 7 is a reduced front view, in elevation, of an end effector 10 with the extending fingers 30 and 32 having moved in the direction of arrows 118 and 120, respectively, to engage the vertically disposed external walls 122 and 124 of a vacuum tool 126 which, when provided with a vacuum, via flexible line 128, is capable of engaging and retaining a flat element or component 130 that may then be raised and moved by computer control to a specified location by a computer 2 directing the movement of the robotic arm, (FIG. 1), to which the end effector 10 is affixed. Breaking the vacuum line 128 by means of a conventional automatic valve system controlled by the computer 2 releases element 130 in a prescribed location wherein the robotic arm may be moved to pick up another element and dispose it in its proper location in the identical manner. Once the vacuum tool 126 has completed its prescribed functions it may be placed back within a prescribed resting place or tool crib, not shown, and another tool may be obtained in a like manner FIG. 7A is an enlarged partial perspective view of the tooss shown in FIG. 7 and more clearly demonstrates the means of engagement utilized. The geometrical configuration of the engagement device 132 may be diamond-shaped and may correspond to a diamond aperture provided in the extending finger portions, FIGS. 10 and 10A of an end effector 10. By providing an undercut groove in the diamond configuration, engagement with a roll pin 78 will maintain the mechanical integrity of the system and lock the vacuum tool 126 in place.

Figure 8A:
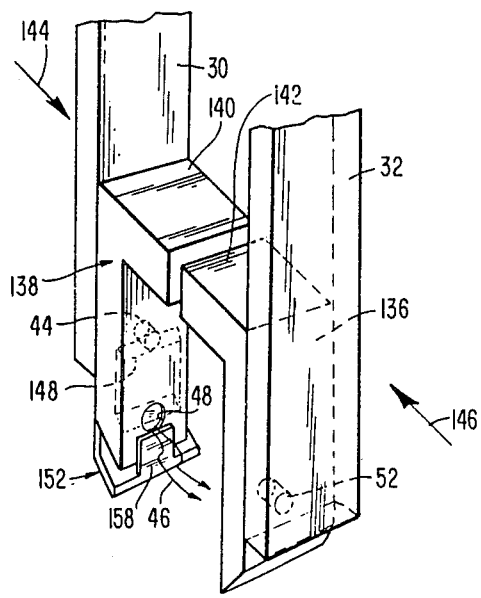

Referring now to FIGS. 8 and 8A, wherein FIG. 8 shows a reduced pictorial representation of an end effector 10 having engaged the outwardly extending surfaces 134 and 136 of a grasping tool 138, that has been provided with a pair of inwardly extending protrusions 140 and 142, which limits the movement in the direction of arrows 144 and 146 of finger portions 30 and 32, respectively. The grasping tool 138 is provided at its inmost portions with a pair of rhomboid prisms or mirrors 148 and 150, whose sole function is to reflect or refract the light beam 46 emanating from the light source 44 so that it may impinge upon the light detector 52 which provides electrical output to the control computer 2. Thus, an object appearing between the halves of tool 138 interrupting the infrared light beam 46 causes a signal to be generated informing the control computer logic that the tool is encompassing an object, as required. In addition, a collision or contact sensor 152 may be provided on the distal end of one side of the downwardly extending portion 154 or 156 of grasping tool 138 so that when contact sensor 152 contacts an object it deflects the vertical vane portion 158 of sensor 152 into the path of the infrared light beam 46, thereby cutting off the light beam sending a signal to the control computer 2 that contact has been made with that particular portion of the grasping tool 138.

Figures 9, 10:
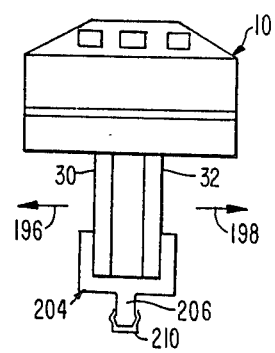
Figure 9A:
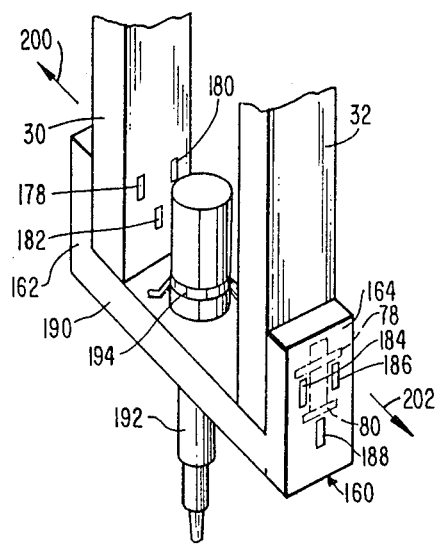

FIGS. 9 and 9A show a further alternative embodiment of a tool 160 which includes a pair of essentially parallel upwardly extending portions 162 and 164 provided with inwardly extending protrusions 166, 168, 170, 172, 174 and 176 disposed in a triangular configuration on upwardly extending walls 162 and 164, respectively. Protrusions 166, 168 and 170 are adapted to be received into apertures 178, 180 and 182 provided proximate the distal end of finger portion 30. Protrusions 172, 174 and 176 are adapted to be received into apertures 184, 186 and 188 provided proximate the distal end of finger portion 32. Of course, V-grooves are provided in the extending portions hereagain, so that engagement with roll pins 78 and 80, upon activation of piston 68 responsive to a control computer command signal similar to that described in FIG. 4, may be utilized to retain the tool 160 in fixed position maintaining the mechanical integrity of the robotic arm.

The generally horizontal flat portion 190 of tool may be utilized to affix a pneumatic screwdriver 192 thereon by means of a clamping bracket 194. Thus, the pneumatic screwdriver may be accurately positioned maintaining the mechanical integrity of the robotic arm. A miniature screwdriver of the type manufactured by the Foredom Electric Company, of Bethel, Conn. is ideally suited for this application. Similarly, an automatic feed screwdriver manufactured by the Willi Corporation at Conover, N.C. may also be utilized with a mounting to the horizontally disposed portion of tool 160 by means of a flexible bracket or any other suitable means. The tool utilized may also be of the type which automatically inserts screws and then provides the necessary torquing mechanism to set them in place in the equipment.

It is to be noted that in this type of tool, the capturing and engaging mechanism the finger portions 30 and 32 of the end effector 12 move in an outwardly direction to engage the tool 160 rather than in an inwardly direction as discussed hereinbefore.

Figure 10A:
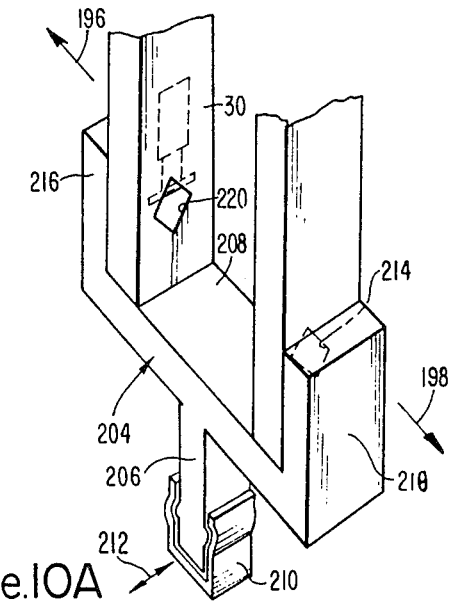

An alternative embodiment of an end effector tool is disclosed in FIGS. 10 and 10A. The movement of the end effector extending portions 30 and 32 in this tool configuration will move in the direction of arrows 196 and 198 in the same manner as finger portions 30 and 32 move in the direction of arrows 200 and 202, all movements being in a linear direction. Tool 204 described in FIGS. 10 and 10A is similar in general construction to tool 160 shown in FIGS. 9 and 9A with the exception that the downwardly extending portion 206 provided on the horizontal portion 208 of tool 204 is solid and formed in one piece and may readily be utilized for the capturing of an item such as a battery clip 210 which may be positioned to a receiving assembly wherein once placed in position the tool may be moved in the direction of arrow 212 leaving the clip 210 in the assembly. In the embodiment a singular geometric configuration 214, preferably diamond-like in shape is provided on the upwardly extending portions 216 and 218 which are adapted to be received through apertures 220 provided in finger portions 30 and 32.

Thus, hereinbefore has been disclosed an exchangeable end effector tool capable of readily engaging and being maintained locked) in the extending fingers of an end effector while maintaining the mechanical integrity of the robotic arm. The tool is capable of being exchanged by using the robotic arm with the aid of computer commands and the robotic arm therefore can perform a plurality of functions by the end effector merely replacing one tool for another. It will be understod that various changes in the details, materials, arrangement of parts and operating conditions which have been herein described and illustrated in order to explain the nature of the invention may be made by those skilled in the art within the principles and scope of the instant invention

Having thus set forth the nature of the invention, what is claimed is:

1. An exchangeable end effector tool, suitable for attachment upon a robotic end effector disposed on the distal end of a robotic arm, comprising in combination:
I. a robotic end effector having;
   (A) at least two extending linear moving fingers including;
      (a) finger indexing means disposed proximate the distal end of each said fingers, and
      (b) a locking device disposed internally within each said fingers, said locking device having a first affixing position and a second releasing positions; and
      (c) remote means for moving said locking device from said first to said second position; and
II. an exchangeable tool having;
   (A) tool engaging means accessible to the distal end of said end effector extending fingers including;
      (a) tool indexing means for mating and cooperating with said finger indexing means, said tool indexing means including;
         (i) at least one protruding portion having a geometerical arrangement that permits only one position for positive engagement with a mating portion provided proximate the distal end of each said end effector fingers, having;
            1. tool alignment means for maintaining the dimensional integrity of said robotic arm when engaged in said robotic fingers, and
            2. tool receiving means for receiving a portion of said finger locking device for affixing or releasing said end effector tool to each said end effector fingers upon movement of said end effector locking device from said first position to said second position; and
   (B) tool means haivng said engaging means affixed thereon, said tool means being selected to perform a prescribed function.

2. An exchangeable end effector tool according to claim 1 wherein said tool alignment means includes a plurality of rectangularly-shaped protruing portions adapted to be received into cooperating apertures proximate the distal end of each said fingers, each said protruding portion having a V-shaped groove adapted to cooperate with said portion of said end effector finger locking device when engaged.

3. An exchangeable end effector tool, suitable for attachment upon a robotic end effector disposed on the distal end of a robotic arm, comprising in combination:
I. a robotic end effector having:
   (A) at least two extending linear moving fingers including;
      (a) finger indexing means disposed proximate the distal end of each said fingers, and
      (b) a locking device disposed internally within each said fingers, said locking device having a first affixing position and a second releasing position; and
      (c) remote means for moving said locking device from said first to said second postion; and
(II) an exchangeable tool having;
   (A) tool engaging means accessible to the distal end of said end effector extending fingers including;
      (a) tool indexing means having an upwardly extending U-shaped portion so that said tool indexing means is accessible for engagement by said end effector fingers when said fingers are moving linearly for mating and cooperating with said finger indexing means, said tool indexing means including;
         (i) at least one protruding portion having a geometerical arrangement that permits only one portion for positive engagement with a mating portion provided proximate the distal end of each said end effector fingers having;
            1. tool alignment means for maintaining the dimensional integrity of said robotic arm when engaged in said robotic fingers, and
            2. tool receiving means for receiving a portion of sadi finger locking device affixing or releasing said end effector tool to each said end effector finger upon movement of said end effector locking device from said first position to said second position; and
   (B) tool means having said engaging means affixed thereon, said tool means being selected to perform a prescribed function.

4. An exchangable end effector tool according to claim 1 wherein said tool engaging means includes an upwardly extending U-shaped portion containing said tool indexing means so that said tool indexing means is accessible for engagement by each said end effector fingers when said fingers are moving linearly in an opening direction.

5. An exchangeable end effector tool according to claim 1 wherein said tool engaging means includes an upwardly extending U-shaped portion containing said tool indexing means so that said tool indexing means is accessible for engagement by each said end effector fingers when said fingers are moving linearly in a closing direction.

6. An exchangeable end effector tool according to claim 1, wherein said end effector tool further includes means for sensing when said tool encompasses an object.

7. An exchangeable end effector tool according to claim 1, wherein said end effector tool further includes means for sensing when said tool comes into contact with an object.

8. An exchangable end effector tool according to claim 1, wherein said tool comprises:
   (a) first and second generally flat and parallel surfaces having disposed thereon said tool engaging means; and
   (b) a third surface disposed transversely to said parallel surfaces, said third surface having said tool means disposed thereon.

9. An exchangeable end effector tool according to claim 3, wherein said tool receiving means includes a V-shaped groove provided in at least one protruding portion adapted to cooperate with pins provided on said end effector finger locking device when activated.

10. An exchangeable end effector tool according to claim 3, wherein said tool indexing means is accessible for engagement by each said effector fingers when said fingers are moving linearly in an opening direction.

11. An exchangeable end effector tool according to claim 3, wherein said tool indexing means is accessible for engagement by each said effector fingers when said fingers are moving linearly in a closing direction.

12. An exchangeable end effector tool according to claim 3, wherein said tool means further includes means for sensing when said tool means encompasses an object.

13. An exchangeable end effector tool according to claim 3, wherein said tool means further includes means for sensing when said tool means comes into contact with an object.

14. An exchangeable end effector tool, suitable for attachment upon a robotic end effector disposed on the distal end of a robotic arm, comprising in combination:
I. a robotic end effector having;
  (A) at least two extending linear moving fingers for engaging an exchangeable tool when moving in a closing direction or a opening direction, said linear moving fingers including;
    (a) finger indexing means disposing proximate the distal end of each said fingers, and
    (b) a locking device disposed internally within each said fingers, said locking device having a first affixing position and a second releasing position; and
    (c) remote means for moving said locking device from said first to said second position; and
II. an exchangeable tool having;
  (A) tool engaging means accessible to the distal end of each said end effector extending fingers when said end effector fingers are moving outwardly or inwardly said extending fingers including;
    (a) tool indexing means for mating and cooperating with said finger indexing means,
    (b) means for cooperating with said finger locking device; and
  (B) tool means having said engaging means affixing thereon, said tool means being selected to perform a prescribed function.

15. An exchangeable end effector tool, suitable for attachment upon a robitic end effector disposed on the distal end of a robotic arm, said end effector having at least a pair of linearly moving extending fingers with finger indexing means disposed proximate the distal end thereof, each said fingers including an internally disposed locking device activated in response to a remote activation means, said exchangeable end effector tool comprising:
  (a) tool engaging means, said engaging means being accessible to the distal end of said end effector fingers and including;
    (i) tool indexing means having a plurality of protrusions for extending into and cooperating with said finger indexing means provided proximate the distal end of each said end effector fingers, and
    (ii) means for receiving and cooperating with a portion of said end effector locking device for retaining said tool or releasing sai tool from said extending fingers upon said end effector locking device being activated by said remote activation means; and
  (b) tool means having said engaging means affixed thereon, said tool means being selected to perform a prescribed function or grasp an object.

16. An exchangeable end effector tool, according to claim 15 wherein said tool means includes two separate identical pieces.

17. An exchangeable end effector tool, according to claim 15 wherein said tool means includes two separate dissimilar pieces, each piece having identical tool engaging means disposed thereon.

* * * * *